(12) United States Patent
Takemi (10) Patent No.: US 8,128,385 B2
(45) Date of Patent: Mar. 6, 2012

(54) VALVE STRUCTURE

(75) Inventor: Yukihiko Takemi, Handa (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 287 days.

(21) Appl. No.: 12/412,578

(22) Filed: Mar. 27, 2009

(65) Prior Publication Data

US 2009/0289210 A1 Nov. 26, 2009

(30) Foreign Application Priority Data

May 23, 2008 (JP) ................................. 2008-135352

(51) Int. Cl.
*F04B 39/10* (2006.01)

(52) U.S. Cl. ........................................ 417/571; 137/856

(58) Field of Classification Search .................. 417/438, 417/443, 446, 451, 452, 479, 482, 490, 491, 417/509, 535, 536, 537, 538, 559, 571, 269, 417/569; 137/511, 512.15, 514.7, 516.11, 137/516.19, 522, 523, 843, 844, 845, 846, 137/852, 854, 855, 856, 512.1, 516.15, 516.21, 137/516.23, 516.25, 851; 251/366
See application file for complete search history.

(56) References Cited

U.S. PATENT DOCUMENTS 2,599,898 A * 6/1952 Dalrymple ................. 137/454.4
(Continued)

FOREIGN PATENT DOCUMENTS

JP 2006-266414 10/2006

*Primary Examiner* — Devon C Kramer
*Assistant Examiner* — Leonard Weinstein
(74) *Attorney, Agent, or Firm* — Buchanan, Ingersoll & Rooney PC (57) ABSTRACT

A valve structure includes a partition wall, a communicating bore, a valve body and a restraining portion. The partition wall is provided in a fluid container for dividing the fluid container into a first fluid chamber and a second fluid chamber. The communicating bore is provided at the partition wall for establishing a fluid communication between the first and second fluid chambers. The valve body is provided at the partition wall for establishing and interrupting the fluid communication between the first and second fluid chambers. Further, the valve body includes an umbrella shaped valve portion being flexibly deformable for opening and closing the communicating bore. The restraining portion is provided for restraining a deforming amount of the valve portion when the valve portion is deformed in a direction to be separated from the partition wall.

20 Claims, 6 Drawing Sheets

U.S. PATENT DOCUMENTS

| | | | | |
|---|---|---|---|---|
| 2,998,827 | A * | 9/1961 | Cook et al. | 137/543.13 |
| 3,679,333 | A * | 7/1972 | Zoppi | 417/571 |
| 5,025,828 | A * | 6/1991 | Lin | 137/512 |
| 5,174,735 | A * | 12/1992 | Gannaway | 417/550 |
| 5,213,125 | A * | 5/1993 | Leu | 137/15.18 |
| 5,265,646 | A * | 11/1993 | Richardson | 137/856 |
| 5,785,081 | A * | 7/1998 | Krawczyk et al. | 137/516.23 |
| 5,803,122 | A * | 9/1998 | Theilmeier | 137/854 |
| 6,454,545 | B1 * | 9/2002 | Ikeda et al. | 417/269 |
| 2005/0249608 | A1 * | 11/2005 | Tagami | 417/269 |
| 2007/0065310 | A1 * | 3/2007 | Nakajima | 417/413.1 |

* cited by examiner

FIG. 7 Prior Art

VALVE STRUCTURE

CROSS REFERENCE TO RELATED APPLICATIONS

This application is based on and claims priority under 35 U.S.C. §119 to Japanese Patent Application 2008-135352, filed on May 23, 2008, the entire content of which is incorporated herein by reference.

FIELD OF THE INVENTION

The present invention generally relates to a valve structure.

BACKGROUND

Figure 7:
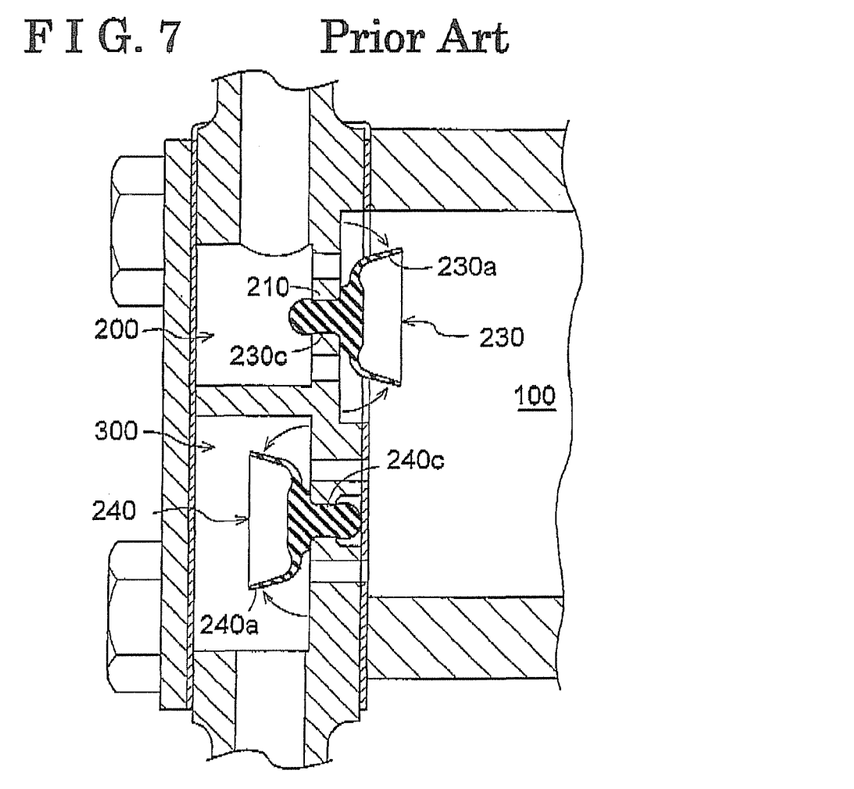
FIG. 7 is a cross sectional side view illustrating a valve structure according to a known art.

A known valve structure, which is applicable to an air pump as an example, includes a first fluid chamber 100, a second fluid chamber 200/300, a partition wall 210 for partitioning the first and second fluid chambers 100 and 200/300, a communicating hole, which is provided at the partition wall to establish a fluid communication between the first and second fluid chambers 100 and 200, and a valve body 230/240, which is also provided at the partition wall, for example, as illustrated in FIG. 7. The valve body 230/240 includes a flexible valve portion 230a/240a formed in an umbrella shape for occluding the communicating hole. The valve portion 230a of the valve body 230 is provided at the partition wall 210 at a first fluid chamber side, for example. In such a structure, when a fluid pressure generated in the second fluid chamber 200 is lower than a fluid pressure generated in the first fluid chamber 100, the valve portion 230a is flexibly deformed towards the partition wall 210 (i.e., in a direction where an end portion of the valve portion 230a approaches the partition wall 210), thereby occluding the communicating hole. On the other hand, when the fluid pressure of the second fluid chamber 200 is higher than the first fluid chamber 100, the valve portion 230a of the valve body 230 is flexibly deformed in a direction to be away from the partition wall 210, thereby opening the communicating hole. Thus, the valve body 230 structures a check valve (non-return valve) for allowing a fluid communication from the second fluid chamber 200 to the first fluid chamber 100.

According to such valve structure, the valve body 230 is simply provided at the partition wall 210. Such valve structure is disclosed in JP2006-266414A as an example.

According to the known valve structure, when high fluid pressure is generated in the first and second fluid chambers 100 and 200, the fluid inside the second fluid chamber 200 spouts out from the communicating hole provided at the partition wall 210 in response to the difference between the fluid pressure generated in the first fluid chamber 100 and the fluid pressure generated in the second fluid chamber 200. The spouting fluid makes contact with the umbrella shaped valve portion 230a, and the valve portion 230 is accordingly deformed in the direction to be away from the partition wall 210. At this time, when a large pressure difference is generated between the first and second fluid chambers 100 and 200 and the fluid accordingly spouts from the communicating hole at high pressure, the umbrella shaped valve portion 230a is deformed to be approximately inside out, i.e., the umbrella shaped valve portion 230a is deformed in a direction opposite to a base portion 230c of the valve body 230, as illustrated in FIG. 7. When the valve portion 230a is deformed in such manner, a large strain is generated at a connecting portion between the valve portion 230a and the base portion 230c. Furthermore, in a condition where the valve portion 230a is frequently and repetitively deformed in such manner, the connecting portion between the valve portion 230a and the base portion 230c is fatigued, and a crack may be generated thereat. In the same manner, in a structure where the valve portion 240a of the valve body 240 is provided at the partition wall 210 at a second fluid chamber side and the valve portion 240a is deformed for allowing and interrupting a fluid communication from the first fluid chamber 100 to the second fluid chamber 200, the umbrella shaped valve portion 240a is deformed in a direction opposite to a base portion 240c of the valve body 240, and a connecting portion between the valve portion 240a and the base portion 240c is fatigued to generate a crack thereat.

A need thus exists for a valve structure, which is not susceptible to the drawback mentioned above.

SUMMARY OF THE INVENTION

According to an aspect of the present invention, a valve structure includes a partition wall, a communicating bore, a valve body and a restraining portion. The partition wall is provided in a fluid container for dividing the fluid container into a first fluid chamber and a second fluid chamber. The communicating bore is provided at the partition wall for establishing a fluid communication between the first and second fluid chambers. The valve body is provided at the partition wall for establishing and interrupting the fluid communication between the first and second fluid chambers. Further, the valve body includes an umbrella shaped valve portion being flexibly deformable for opening and closing the communicating bore. The restraining portion is provided for restraining a deforming amount of the valve portion when the valve portion is deformed in a direction to be separated from the partition wall.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of a valve structure will be described hereinbelow. According to the embodiment, the valve structure is assembled onto an air pump as an example. Hereinafter, a term "fluid" will be employed for indicating any gaseous substances, such as air, as well as liquids. As illustrated in FIGS. 1 to 5, the air pump mainly includes a cylinder A, a valve housing B and a casing C, and the like. A pump chamber (serving as a first fluid chamber) 1 is formed inside the cylinder A, while an intake chamber (serving as a second fluid chamber) 2 and a discharge chamber (serving as the second fluid chamber) 3 are formed inside the valve housing B. Further, a crank chamber 4 is formed inside the casing C. A capacity of the pump chamber 1 is changeable to be increased and decreased. The cylinder A and the valve housing B structure a fluid container. Air (serving as a fluid) is charged to the pump chamber 1 from the intake chamber 2. Further, the air inside the pump chamber 1 is discharged therefrom to the discharge chamber 3.

The air pump according to the embodiment is applicable to a vehicle, for example. More specifically, the air pump may be applied to a compressor for discharging the air to an air suspension system as an example. According to such compressor, the intake chamber 2 is opened to an external ambient, the discharge chamber 3 is connected to the air suspension system mounted onto the vehicle, and the capacity of the pump chamber 3 is changed to be increased and decreased, thereby discharging the air to the air suspension system. Further, the air pump may be applied to a vacuum pump for suctioning the air accumulated inside a brake booster as another example. In such vacuum pump, the discharge chamber 3 is opened to an external ambient, the intake chamber 2 is connected to the brake booster mounted onto the vehicle, and the capacity of the pump chamber 1 is changed to be increased and decreased, thereby suctioning the air accumulated in the brake booster.

Figure 1:
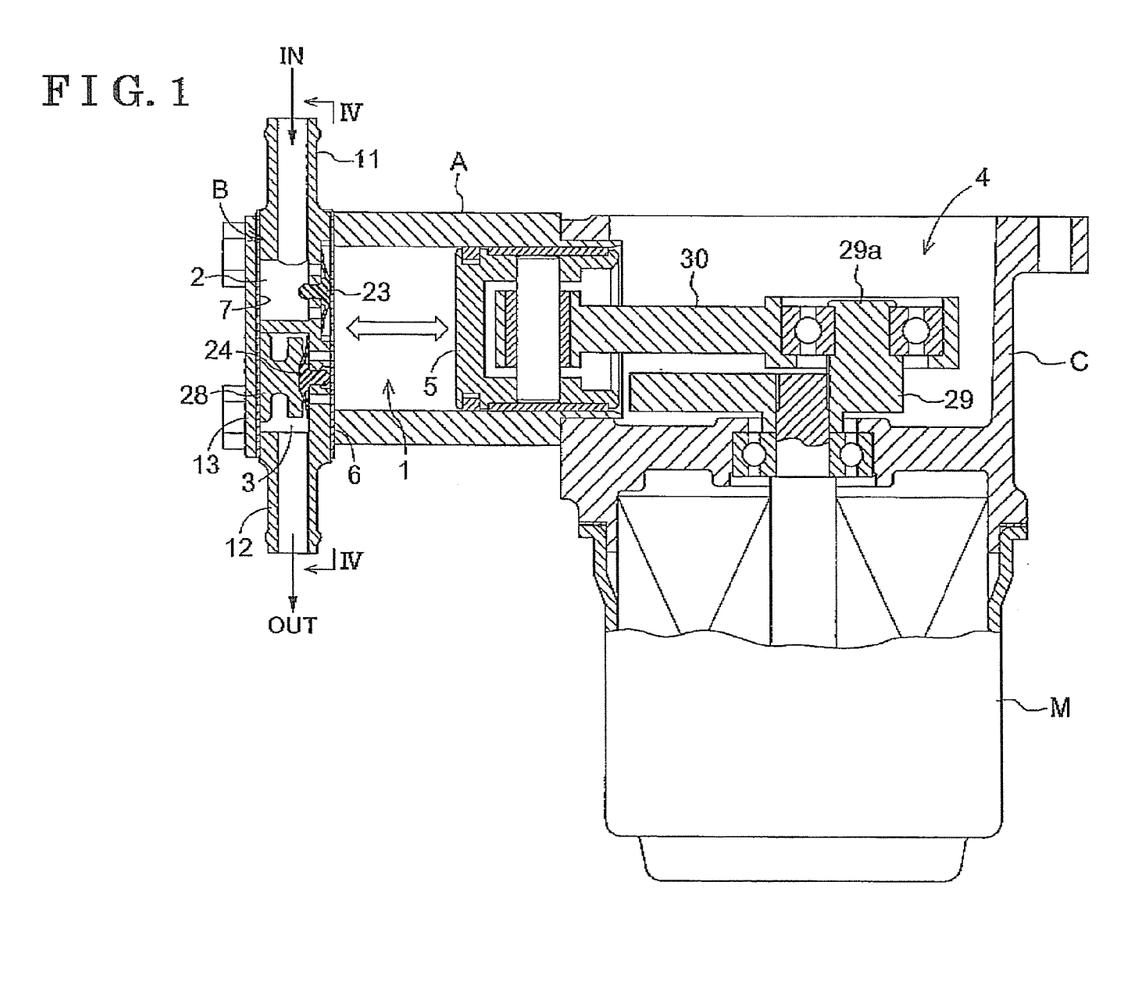
FIG. 1 is an entire cross sectional side view illustrating an air pump including a valve structure, according to an embodiment of the present invention.
Figure 2:
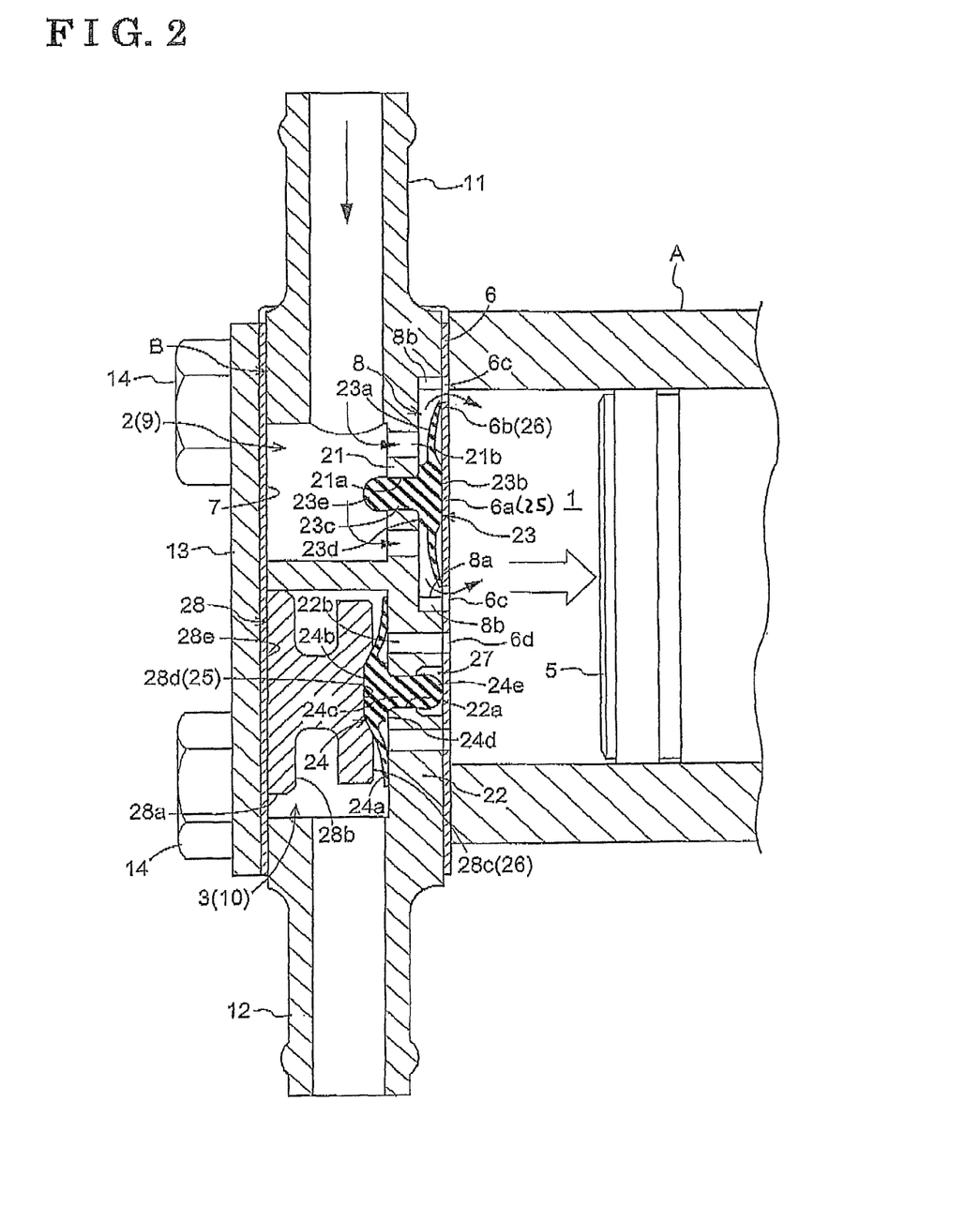
FIG. 2 is a cross sectional side view illustrating the valve structure.

As illustrated in FIG. 1, the cylinder A is structured to have a cylindrical form. A piston 5 is provided inside the cylinder A and is arranged to reciprocate in an axial direction of the cylinder A along an inner circumferential surface thereof. The valve housing B is assembled onto one end surface of the cylinder A via a first gasket member 6. The valve housing B is formed in an approximately triangular flat shape. The first gasket member 6 is made from an approximately triangular plate member. The pump chamber 1 is defined (sectioned) by the cylinder A, the piston 5 and an end portion (cylinder-side end portion) of the valve housing B.

Figure 5:
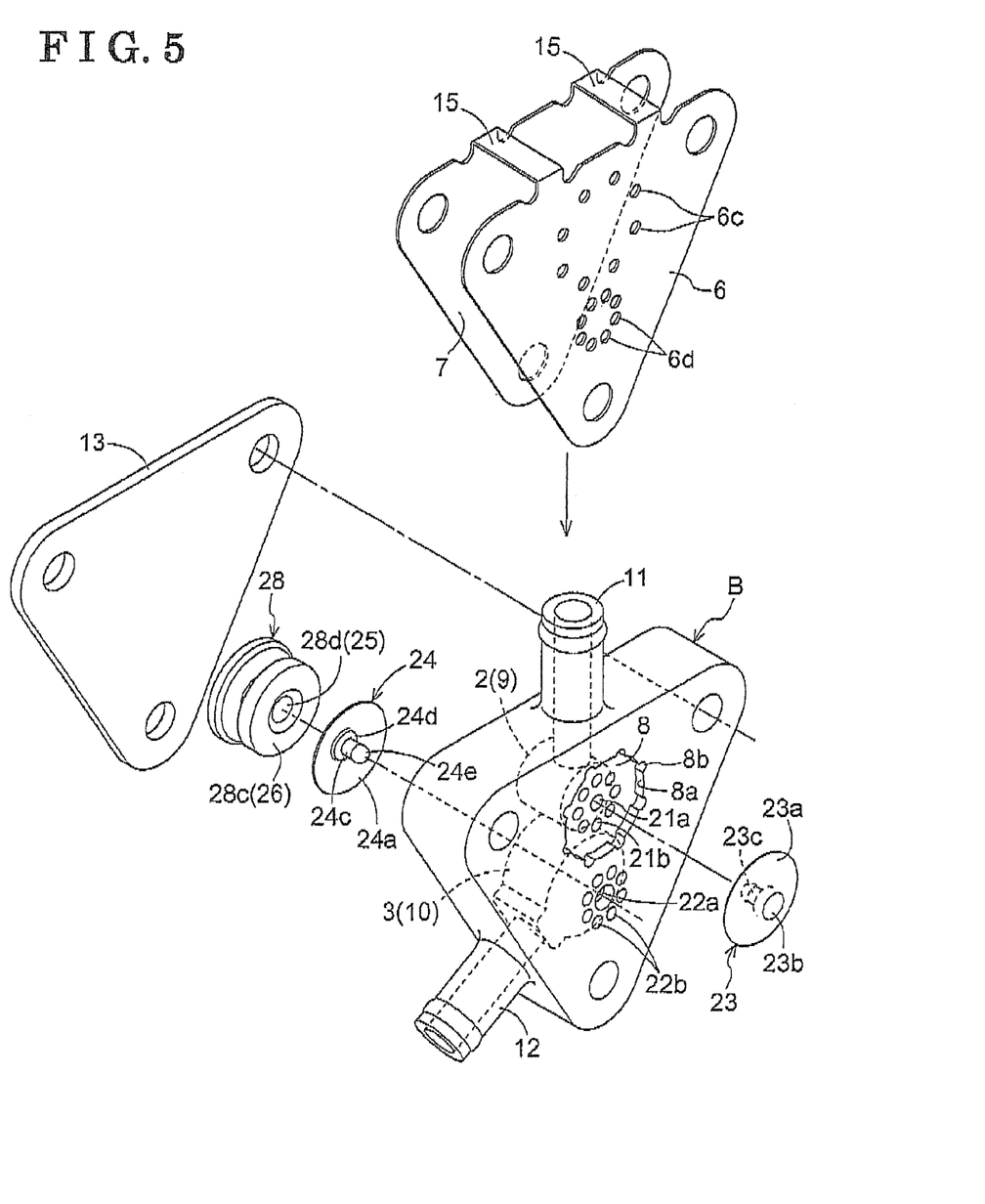
FIG. 5 is an exploded perspective view illustrating the valve body of the valve structure.

As illustrated in FIGS. 2 to 5, a cylindrical recessed portion 8 is formed at the valve housing B at the cylinder-side end surface thereof. A small cylindrical bore 9 and a large cylindrical bore 10 are formed at another end surface of the valve housing B, i.e., an end surface opposite to the cylinder-side end surface. As will be described below, the small cylindrical bore 9 and the large cylindrical bore 10 structure the intake chamber 2 and the discharge chamber 3, respectively. Further, an intake pipe 11 and a discharge pipe 12 are formed at a side surface of the valve housing B. The intake pipe 11 communicates with the small cylindrical bore 9, while the discharge pipe 12 communicates with the large cylindrical bore 10. The cylindrical recessed portion 8 and the small cylindrical bore 9 are aligned in the axial direction of the cylinder A. A contacting plate 13 is assembled onto the valve housing B at the end surface opposite to the cylinder-side end surface (hereinafter, the end surface opposite to the cylinder-side end surface is referred to as a contacting plate-side end surface) by means of bolts 14 via a second gasket member 7. The contacting plate 13 is made from an approximately triangular plate member, and the second gasket member 7 is also made from an approximately triangular plate member. The intake chamber 2 is defined (sectioned) by the contacting plate 13 and the small cylindrical bore 9, while the discharge chamber 3 is defined (sectioned) by the contacting plate 13 and the large cylindrical bore 10. Each of the first and second gasket members 6 and 7 (each serving as a gasket member) is made by laminating a rubber member to both side surfaces of an iron plate, so that each of the first and second gasket members 6 and 7 includes a sandwich structure. The first and second gasket members 6 and 7 are employed for maintaining fluid tightness (air tightness and liquid tightness, for example) of the cylinder A and the valve housing B. As illustrated in FIG. 5, the first and second gasket members 6 and 7 are connected by a pair of connecting members 15.

A first partition wall 21 is provided between the pump chamber 1 and the intake chamber 2 for partitioning the pump chamber 1 and the intake chamber 2. An assembling bore 21a and plural communicating bores 21b are formed at the first partition wall 21 for establishing a fluid communication between the pump chamber 1 and the intake chamber 2. The communicating bores 21b are aligned in a circumferential direction about the assembling bore 21a as a center while having a distance from adjacent communicating bores 21b. Plural cutout portions 8b are formed at a side wall portion 8a of the recessed portion 8 at positions respectively corresponding to the communicating bores 21b of the first partition wall 21. More specifically, the cutout portions 8b are formed by recessing the side wall portion 8a in a radial direction of the cylindrical recessed portion 8. An internal diameter of the side wall portion 8a of the recessed portion 8 is arranged to be slightly larger than an external diameter of a first umbrella valve 23 (serving as a valve body). Accordingly, the capacity of the recessed portion 8 is arranged to be the minimum, so that a space capacity of the cylinder A is arranged to be the minimum when the piston 5 moves relative to the cylinder A and accordingly reaches a top dead center. Further, because the cutout portions 8b are formed only at the positions respectively corresponding to the communicating bores 21b of the first partition wall 21, the space capacity of the cylinder A, which is obtained when the piston 5 reaches the top dead center, is not arranged to be excessively large. Accordingly, the fluid accumulated inside the intake chamber 2 surely flows to the pump chamber 1 when the first umbrella valve 23 is operated (deformed to open the communicating bores 21b). The first umbrella valve 23 serving as a valve body is provided at the first partition wall 21 at a pump chamber-side surface so that the fluid is suctioned to the pump chamber 1.

The first umbrella valve 23 includes a valve portion 23a, a top portion 23b, a base portion 23c, a step portion 23d and a large diameter portion 23e. The valve portion 23a is formed in the umbrella shape so as to be flexibly deformable for opening and closing the communicating bores 21b of the first partition wall 21. The top portion 23b is formed at an end portion of the umbrella shaped valve portion 23a. The base portion 23c is inserted into the assembling bore 21a of the first partition wall 21. The step portion 23d is provided at one end portion of the base portion 23c at a side being adjacent to the valve portion 23a. The large diameter portion 23e is provided at another end portion of the base portion 23c at a side being opposite from the valve portion 23a. A diameter of the large diameter portion 23e is arranged to be larger than a diameter of the base portion 23c. The large diameter portion 23e protrudes from the first partition wall 21 to the intake chamber 2 in a condition where the base portion 23c of the first umbrella valve 23 is inserted through the assembling bore 21a. The valve portion 23a is housed inside a cylindrical space defined (surrounded) by the recessed portion 8 and the first gasket member 6, and the step portion 23d is arranged to contact the pump chamber-side surface of the first partition wall 21. Further, the top portion 23b is arranged to contact the first gasket member 6. A contacting portion on the first gasket member 6, at which the first gasket member 6 and the top portion 23b of the first umbrella valve 23 contact each other, is referred to as a contacting portion 6a.

So configured, the contacting portion 6a of the first gasket member 6 structures a supporting portion 25 for supporting the top portion 23b of the first umbrella valve 23 by pressing the top portion 23b so as to prevent the first umbrella valve 23 from dislocating from the partition wall 21. The first gasket member 6 further includes a contacting portion 6b, at which the valve portion 23a makes contact with the first gasket member 6 when the valve portion 23a is deformed in the direction to be away from the first partition wall 21 towards the pump chamber 1. The contacting portion 6b functions as a restraining portion 26 for restraining a deforming amount (deforming range) of the valve portion 23a when the valve portion 23a is deformed in the direction to be away from the first partition wall 21. Plural communicating bores 6c are formed at a radially outer side of the contacting portion 6b. The communicating bores 6c are aligned in the circumferential direction.

A second partition wall 22 is provided between the pump chamber 1 and the discharge chamber 3 for dividing (partitioning) the pump chamber 1 and the discharge chamber 3. An assembling bore 22a and plural communicating bores 22b are formed at the second partition wall 22 for establishing fluid communication between the pump chamber 1 and the discharge chamber 3. The communicating bores 22b are aligned in the circumferential direction about the assembling bore 22a as a center while having a distance from adjacent communicating bores 22b. An enlarged diameter hole portion 27 is formed at a pump chamber-side end portion of the assembling bore 22a, i.e., at one side surface, of the second partition wall 22, which is adjacent to the pump chamber 1. Plural communicating bores 6d are formed at the first gasket member 6 at positions respectively corresponding to the communicating bores 22b of the second partition wall 22. A second umbrella valve 24 serving as the valve body is provided at another side surface, of the second partition wall 22, which is opposite to the pump chamber 1.

The second umbrella valve 24 includes a valve portion 24a, a top portion 24b, a base portion 24c, a step portion 24d and a large diameter portion 24e. The valve portion 24a is formed in the umbrella shape so as to be flexibly deformable for opening and closing the communicating bores 22b formed at the second partition wall 22. The top portion 24b is formed at an end portion of the umbrella shaped valve portion 24a. The step portion 24d is provided at one end portion of the base portion 24c at a side being adjacent to the valve portion 24a. The large diameter portion 24e is provided at another end portion of the base portion 24c at a side being opposite to the valve portion 24a. A diameter of the large diameter portion 24e is arranged to be larger than a diameter of the base portion 24c. The large diameter portion 24e is housed in a cylindrical space defined (surrounded) by the enlarged diameter hole portion 27 and the first gasket member 6 in a condition where the base portion 24c of the second umbrella valve 24 is inserted through the assembling bore 22a of the partition wall 22. The valve portion 24a is housed in the discharge chamber 3, and the step portion 24d is arranged to contact the discharge chamber-side surface of the second partition wall 22. Further, the valve portion 24a is arranged to contact a supporting member 28 housed in the discharge chamber 3. The supporting member 28 is structured in an approximately cylindrical form. The supporting member 28 includes a groove portion 28b at an outer circumferential surface 28a. A recessed portion 28d is formed at a partition wall-side surface 28c (hereinafter, referred to as a first surface 28c) of the supporting member 28. The recessed portion 28d is formed in a frustum shape and is engaged with a central area portion of the umbrella shaped valve portion 24a. Another surface of the supporting member 28, i.e., an end surface opposing the partition wall 22 (hereinafter, referred to as a second surface 28e), is arranged to contact the contacting plate 13.

Figure 6:
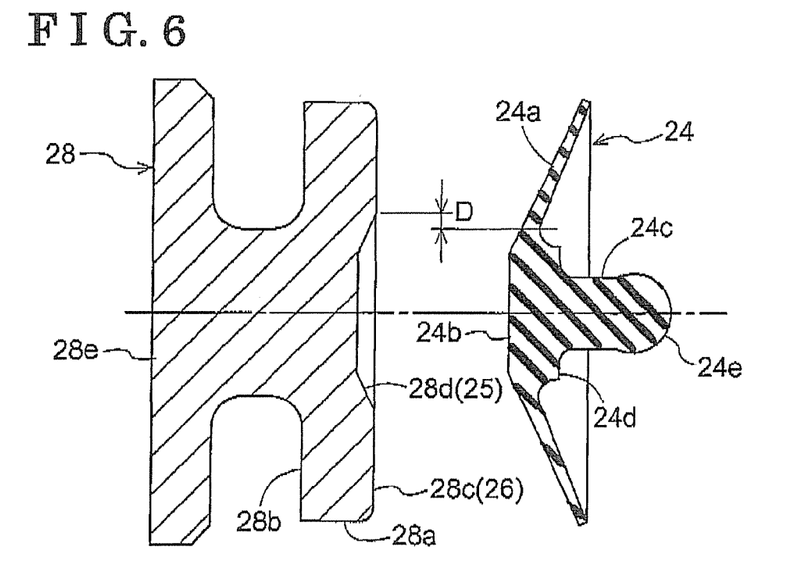
FIG. 6 is a partial view illustrating an umbrella valve and a supporting member provided between a pump chamber and a discharge chamber for discharging a fluid from the pump chamber to the discharge chamber.

So configured, the recessed portion 28d of the supporting member 28 structures the supporting portion 25 for supporting the top portion 24b of the second umbrella valve 24 by pressing the top portion 24b so as to prevent the second umbrella valve 24 from dislocating from the partition wall 22, and the first surface 28c of the supporting member 28 functions as the restraining portion 26 for restraining a deforming amount (deforming range) of the valve portion 24a when the valve portion 24a is deformed in the direction to be away from the second partition wall 22. As illustrated in FIG. 6, the supporting portion 25 presses the central area portion of the umbrella shaped valve portion 24a, and an outer diameter of the supporting portion 25 is arranged to be larger than an outer diameter of the base portion 24c of the second umbrella valve 24.

With such structure, even in a condition where a large pressure difference is generated between the pump chamber 1 and the intake chamber 2 and/or between the pump chamber 1 and the discharge chamber 3 and a fluid spouting pressure is accordingly high, the valve portions 23a/24a are prevented from being deformed to be inside out, i.e., from being deformed in a direction opposing the base portions 23c/24c. Accordingly, a connecting portion between the valve portion 23a and the base portion 23c and/or a connecting portion between the valve portion 24a and the base portion 24c is prevented from being fatigued, thereby preventing a crack from being generated at such connecting portion between the valve portions 23a/24a and the base portions 23c/24c. Still further, a load (fluid pressure) applied to the valve portion 24a is received by a portion defined between an outer diameter portion of the recessed portion 28d (the supporting portion 25) and an outer diameter portion of the base portion 24c of the second umbrella valve 24, i.e., a portion indicated with an arrow D in FIG. 6. Accordingly, a stress force is prevented from intensively generated at the connecting portion between the valve portion 24a and the base portion 24c of the second umbrella valve 24.

The casing C includes a crankshaft 29 therein. A motor M is assembled onto the casing C, and the crankshaft 29 is assembled onto a rotational shaft of the motor M. A crank pin 29a is provided at the crankshaft 29. As illustrated in FIG. 1, an axis of the crank pin 29a is dislocated from the rotational shaft of the motor M. A connecting rod 30 is provided between the crank pin 29a and the piston 5. Due to such structure, the piston 5 is allowed to reciprocate by a driving torque transmitted from the motor M.

Hereinafter, an operation of the valve body will be described. Herein, the intake pipe 11 of the intake chamber 2 is opened to an external ambient, and the discharge pipe 12 of the discharge chamber 3 is connected to an air suspension mounted onto a vehicle. The operation of the umbrella valve 23/24 described hereinbelow is executed when the capacity of the pump chamber 1 is increased and decreased.

[Intake process] In a condition where a capacity of the pump chamber 1 is increased and thus the pressure generated in the pump chamber 1 is lower than the pressure generated in the intake chamber 2 and the pressure generated in the discharge chamber 3 is larger than the pressure generated in the pump chamber 1, the valve portion 23a of the first umbrella valve 23 is accordingly deformed in the direction to be away from the first partition wall 21, thereby allowing the fluid inside the intake chamber 2 to flow to the pump chamber 1. Herein, the air (fluid) spouting from the communicating bore 21b formed at the first partition wall 21 flows inside the cylindrical recessed portion 8 in the radially outer direction and passes through the cutout portion 8b provided at the side wall portion 8a of the recessed portion 8 at the position corresponding to the communicating bores 21b of the first partition wall 21. Thus, the fluid inside the intake chamber 2 is suctioned to the pump chamber 1. Accordingly, fluid flow (air flow from the intake chamber 2 to the pump chamber 1) is not interrupted, and a pumping efficiency is accordingly increased. In the intake process, the second umbrella valve 24 maintains a condition where the valve portion 24a covers the communicating bore 22b.

Figure 3:
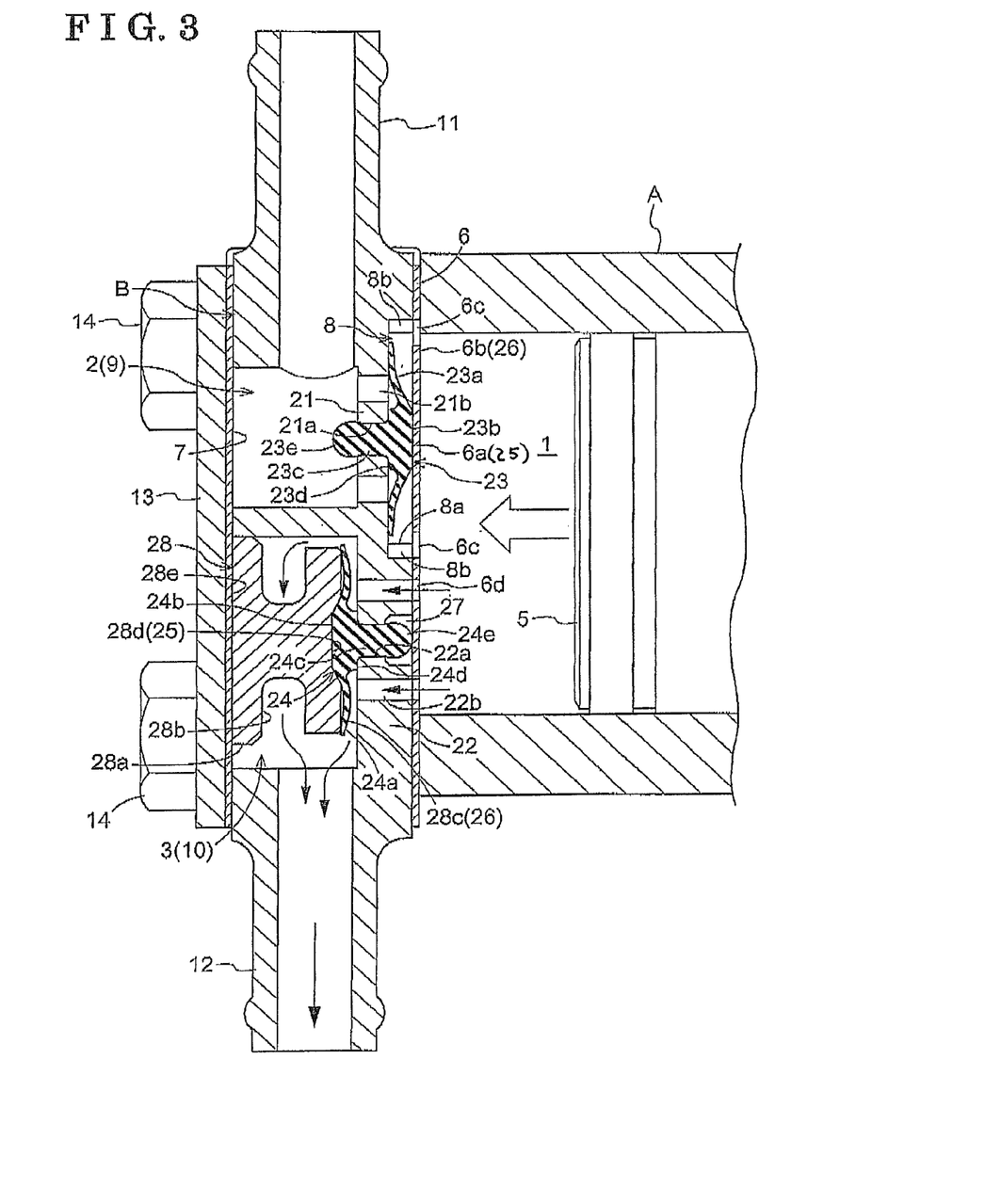
FIG. 3 is a cross sectional side view illustrating the valve structure.
Figure 4:
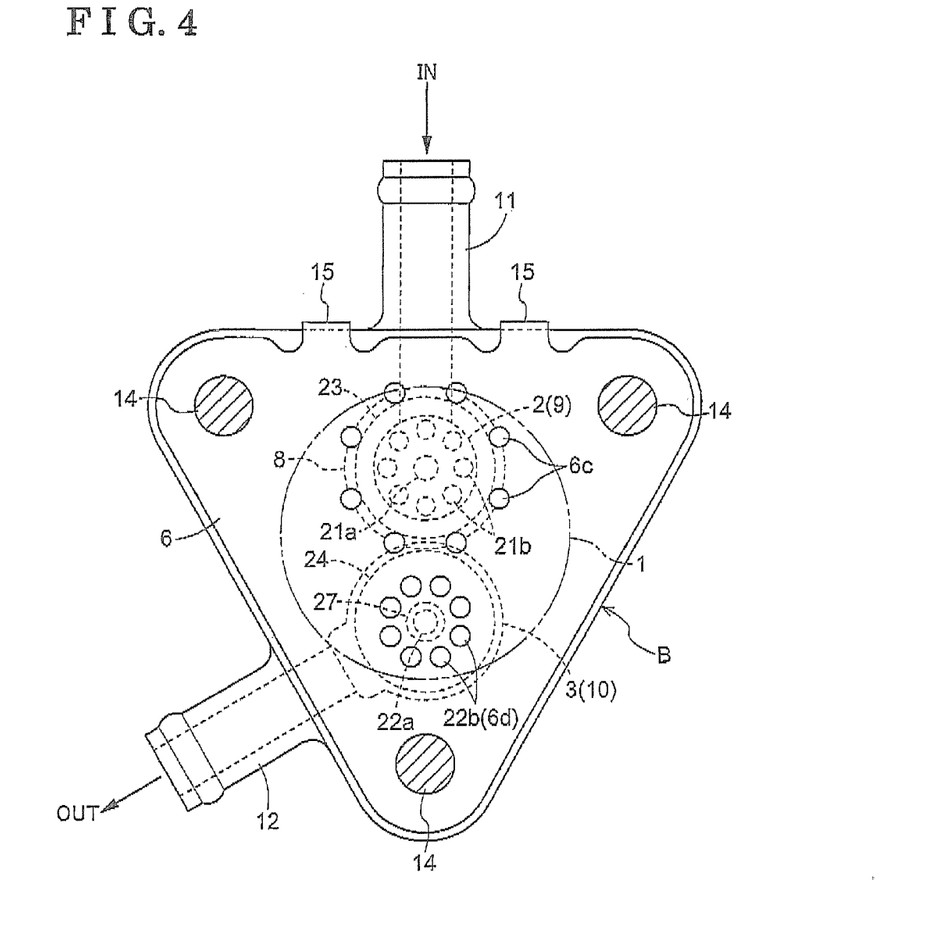
FIG. 4 is a cross sectional view, taken along line IV-IV in FIG. 1, illustrating a valve body of the valve structure.

[Discharge process] In a condition where a capacity of the pump chamber 1 is decreased and thus the pressure generated in the pump chamber 1 is larger than the pressure generated in the intake chamber 2 and the pressure generated in the discharge chamber 3 is lower than the pump chamber 1, the first umbrella valve 23 maintains a condition where the valve portion 23a covers the communicating bores 21b as illustrated in FIG. 3. On the other hand, the valve portion 24a of the second umbrella valve 24 is deformed in the direction where the valve portion 24a is separated from the partition wall 22, thereby allowing the fluid inside the pump chamber 1 to be discharged to the discharge chamber 3. Thus, by repeating the intake process and the discharge process (compressing process), the air is discharged to the air suspension system.

As described above, the valve structure according to the embodiment is applicable to the compressor for discharging the air to the air suspension system, a vacuum pump for suctioning the air accumulated inside a brake booster, and the like.

[Modified embodiment] According to the above described embodiment, the frustum recessed portion 28d, which is engaged with the central area portion of the umbrella shaped valve portion 24a of the second umbrella valve 24, is formed at the first surface 28c of the supporting member 28. Alternatively, a protruding portion to be engaged with the central area portion of the umbrella shaped valve portion 24a may be formed at the first surface 28c of the supporting member 28. Further, the recessed portion 28d may not necessarily be formed at the first surface 28c of the supporting member 28.

Further according to the embodiment, the air is employed as the fluid. However, other gaseous (pneumatic fluids), such as nitrogen, argon, or the like, or hydraulic fluids, such as water, hydraulic oil, and the like, may be employed as the fluid.

Still further according to the embodiment, the piston pump is employed as the pump. Alternatively, a diaphragm pump may be employed as the pump as an example.

Due to the above described structure, when the fluid (air) spouts from the communicating bore 21b/22b and makes contact with the valve portion 23a/24a of the umbrella shaped valve (valve body) 23/24 and accordingly the valve portion 23a/24a of the umbrella shaped valve (valve body) 23/24 is deformed in the direction to be away from the partition wall 21/22, the restraining portion 26 (i.e., the contacting portion 6b, the first surface 28c of the supporting member 28) restrains the deforming amount (deforming range) of the valve portion 23a/24a. Therefore, even in a condition where the large pressure difference is generated between the pump chamber 1 and the intake chamber 2 and/or between the pump chamber 1 and the discharge chamber 3 and the fluid spouting pressure is accordingly high, the valve portion 23a/24a is prevented from being deformed to be inside out, i.e., from being deformed in a direction opposing the base portion 23c/24c. Accordingly, the connecting portion between the valve portion 23a and the base portion 23c and/or the connecting portion between the valve portion 24a and the base portion 24c is prevented from being fatigued, thereby preventing a crack from being generated at such connecting portion between the valve portions 23a/24a and the base portions 23c/24c. Thus, the resistibility of the valve portion 23a/24a is increased.

Further according to the embodiment, the restraining portion 26 is provided at one side of the valve portion 23a/24a, i.e., at the one side opposite to another side at which the partition wall 21/22 is provided.

Still further, the valve structure includes the supporting portion 25 (i.e., the contacting portion 6a of the first gasket member 6, the recessed portion 28d of the supporting member 28). Therefore, the umbrella valve 23/24 is prevented from dislocating from the partition wall 21/22.

Due to the above described structure, because the supporting portion 25 presses the top portion 23b/24b of the umbrella valve 23/24 and prevents the umbrella valve 23/24 from dislocating from the partition wall 21/22, the umbrella valve 23/24 is maintained to be located at an appropriate position.

Still further according to the embodiment, the umbrella valve body 23/24 includes the base portion 23c/24c to be inserted into an assembling bore 21a/22a formed at the partition wall 21/22, and the large diameter portion 23e/24e of which diameter is larger than the diameter of the base portion 23c/24c. Further, the valve portion 23a/24a is formed at one end portion of the base portion 23c/24c, and the large diameter portion 23e/24e is formed at another end portion of the base portion 23c/24c.

Due to the above described structure, as well as the supporting portion 25 pressing the top portion 23b/24b of the umbrella valve 23/24 to prevent the umbrella valve 23/24 from dislocating from the partition wall 21/22, the large diameter portion 23e/24e, which is provided at another end portion of the base portion 23c/24c opposite to the valve portion 23a/24a, prevents the base portion 23c/24c from dislocating from the assembling bore 21a/22a. Thus, the umbrella valve 23/24 is surely prevented from dislocating from the partition wall 21/22 by cooperation of the supporting portion 25 (the contacting portion 6a of the first gasket member 6, the recessed portion 28d of the supporting member 28) and the large diameter portion 23e/24e. The supporting portion 25 is advantageous because if only the large diameter portion 23e/24e is provided for preventing the base portion 23c/24c of the umbrella valve 23/24 from dislocating from the assembling bore 21a/22a of the partition wall 21/22, the diameter of the large diameter portion 23e/24e is required to be larger. Furthermore, with such configuration, a shaft portion, for example, is required to be provided at the large diameter portion 23e/24e. In order to assemble the base portion 23c/24c of the umbrella valve 23/24 onto the partition wall 23/24, the large diameter portion 23e/24e is inserted into the assembling bore 21a/22a by inserting the shaft portion through the assembling bore 21a/22a and then pulling the shaft portion by means of a nipper, for example, and the shaft portion is cut by a cutting tool such as a cutter. Thus, in the condition where only the large diameter portion 23e/24e is provided for preventing the base portion 23c/24c of the umbrella valve 23/24 from dislocating from the assembling bore 21a/22a of the partition wall 21/22, an assembling process may be complicated. On the other hand, according to the above described embodiment, because the umbrella valve 23/24 is prevented from dislocating from the partition wall 21/22 by cooperation of the supporting portion 25 and the large diameter portion 23e/24e, the diameter of the large diameter portion 23e/24e is not required to be excessively large. Further, because the base portion 23c/24c of the umbrella valve 23/24 is assembled onto the partition wall 21/22 only by inserting the large diameter portion 23e/24e through the assembling bore 21a/22a, the assembling process is simplified, thereby improving productivity of the valve structure.

Still further according to the embodiment, the supporting portion 25 presses the central area portion of the valve portion 23a/24a. Further, the diameter of the supporting portion 25 (particularly, the recessed portion 28d of the supporting member 28, for example) is formed to be larger than the diameter of the base portion 24c of the umbrella valve 24.

When the valve portion 23a/24a is deformed for opening and closing the communicating bore 21b/22b of the partition wall 21/22, a stress force is intensively generated at the connecting portion between the valve portion 23a/24a and the base portion 23c/24c. According to the embodiment, because the diameter of the supporting portion 25 (particularly, the recessed portion 28d of the supporting member 28, for example), which presses the central area portion of the valve portion 24a, is formed to be larger than the diameter of the base portion 24c of the umbrella valve 24, the stress force is received by the portion defined between the outer diameter portion of the supporting portion 25 (the recessed portion 28d) and the outer diameter portion of the base portion 24c of the umbrella valve 24. Thus, the stress force is prevented from being intensively generated at the connecting portion between the base portion 24c and the valve portion 24a.

Still further according to the embodiment, the cylinder A and the valve housing B structures the fluid container. The pump chamber 1 serves as the first fluid chamber. The pump chamber 1 is defined by the cylinder A and the piston 5 provided within the cylinder A to reciprocate therein. The intake chamber 2, from which the fluid is suctioned to the pump chamber 1, and the discharge chamber 3, to which the fluid is discharged from the pump chamber 1, serve as the second fluid chamber. The second fluid chamber is formed within the valve housing B. Further, the gasket member (first and second gasket members 6, 7) is provided between the cylinder A and the valve housing B. The restraining portion 26 is provided at the gasket member 6/7.

Due to the above described structure, the gasket member 6/7 is provided between the cylinder A, in which the pump chamber 1 is formed, and the valve housing B, in which the intake chamber 2 and the discharge chamber 3 are formed. Further, the restraining portion 26 (i.e., the contacting portion 6b, the first surface 28c of the supporting member 28) is provided at the gasket member 6/7. Accordingly, the valve structure according to the embodiment includes a simple structure.

Still further according to the embodiment, the recessed portion 8 is formed at the partition wall 21. The umbrella valve (particularly, the first umbrella valve 23, for example) is accommodated in the recessed portion 8.

Due to the above described structure, because the umbrella valve (particularly, the umbrella valve 23) is accommodated in the recessed portion 8 formed at the partition wall 21, the piston 5 is arranged adjacent to the valve housing B. Accordingly, a volume of the pump chamber 1 is arranged to be small wherever possible, thereby improving the pumping efficiency.

Still further according to the embodiment, the cutout portion 8b is formed at a side wall surface portion 8a of the recessed portion 8 at a position corresponding to the communicating bore 21b.

Due to the above described structure, because the cutout portion 8b (according to the embodiment, plural cutout portions 8b) is formed at the side wall surface portion 8a of the recessed portion 8 at the position radially corresponding to the communicating bore 21b (according to the embodiment, at the positions respectively radially corresponding to the plural communicating bores 21b), the fluid spouting from the communicating bore(s) 21b passes through the cutout portion(s) 8b and is smoothly (easily) suctioned to the pump chamber 1. Accordingly, the fluid flow (air flow from the intake chamber 2 to the pump chamber 1) is not interrupted, thereby improving the pumping efficiency. Further, a diameter of a part of the side wall surface portion 8a, i.e., a part which does not radially correspond to the communicating bore(s) 21b, is arranged to be smaller than a diameter of a part of the side wall surface portion 8a at which the cut out portion 8b is formed. Accordingly, the capacity of the recessed portion 8 is arranged to be the minimum, so that a space capacity of the cylinder A is arranged to be the minimum when the piston 5 moves relative to the cylinder A and accordingly reaches the top dead center, thereby improving the pumping efficiency.

Still further according to the embodiment, the intake chamber 2 is adapted to be opened to an external ambient, and the volume of the pump chamber 1 is arranged to be changeable to be increased and decreased. Accordingly, the fluid including air is discharged from the pump chamber 1 to the discharge chamber 3 through the communicating bore 22b.

Still further according to the embodiment, the discharge chamber 3 is adapted to be opened to an external ambient, and the volume of the pump chamber 1 is arranged to be changeable to be increased and decreased. Accordingly, the fluid including air is suctioned from the intake chamber 2 to the pump chamber 1 through the communicating bore 21b.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve structure, comprising:
   a fluid container including a cylinder and a valve housing connected to the cylinder;
   a gasket member between the cylinder and the valve housing which maintains a fluid-tight connection between the cylinder and the valve housing;
   a partition wall provided in the fluid container for dividing the fluid container into a first fluid chamber and a second fluid chamber;
   a communicating bore provided at the partition wall for establishing a fluid communication between the first and second fluid chambers; and
   a valve body provided at the partition wall for establishing and interrupting the fluid communication between the first and second fluid chambers, the valve body including an umbrella shaped valve portion being flexibly deformable for opening and closing the communicating bore, wherein
   the gasket member restrains a deforming amount of the umbrella shaped valve portion when the umbrella shaped valve portion is deformed in a direction to be separated from the partition wall.

2. A valve structure according to claim 1, wherein the gasket member is provided at one side of the umbrella shaped valve portion, the one side opposite to another side at which the partition wall is provided.

3. A valve structure according to claim 1, further comprising:
a supporting portion for supporting a top portion of the umbrella shaped valve portion, whereby the valve body is prevented from dislocating from the partition wall.

4. A valve structure, according to claim 3, wherein the valve body includes a base portion to be inserted into an assembling bore formed at the partition wall, and a large diameter portion with a diameter that is larger than a diameter of the base portion, and the umbrella shaped valve portion is formed at one end portion of the base portion and the large diameter portion is formed at another end portion of the base portion.

5. A valve structure according to claim 3, wherein the supporting portion presses a central area portion of the umbrella shaped valve portion, and a diameter of the supporting portion is formed to be larger than a diameter of the base portion of the valve body.

6. A valve structure, according to claim 1, wherein
the first fluid chamber includes a pump chamber defined by the cylinder and a piston provided within the cylinder to reciprocate therein,
the second fluid chamber is formed within the valve housing,
the second fluid chamber includes an intake chamber from which the fluid is suctioned to the pump chamber and a discharge chamber to which the fluid is discharged from the pump chamber.

7. A valve structure, according to claim 6, wherein
a recessed portion is formed at the partition wall, and
the valve body is accommodated in the recessed portion.

8. A valve structure, according to claim 7, wherein
a cutout portion is formed at a side wall surface portion of the recessed portion at a position corresponding to the communicating bore.

9. A valve structure according to claim 6, wherein
the intake chamber is opened to an external ambient,
a volume of the pump chamber is arranged to be changeable to be increased and decreased, whereby
the fluid including air is discharged from the pump chamber to the discharge chamber through the communicating bore.

10. A valve structure according to claim 6, wherein
the discharge chamber is opened to an external ambient,
a volume of the pump chamber is arranged to be changeable to be increased and decreased, whereby
the fluid including air is suctioned from the intake chamber to the pump chamber through the communicating bore.

11. A valve structure according to claim 1, wherein the valve body is held between the gasket member and the partition wall.

12. A valve structure comprising:
a cylinder possessing a first chamber;
a valve housing connected to the cylinder and possessing a second chamber;
a gasket member between the cylinder and the valve housing, the gasket member maintaining a fluid-tight connection between the cylinder and the valve housing;
a partition wall separating the first chamber and the second chamber;
a communicating bore extending through the partition wall to fluidly communicate the first chamber and the second chamber; and
a valve body positioned between the gasket member and the partition wall, the valve body including a flexibly deformable umbrella-shaped valve portion for opening and closing the communicating bore, the flexibly deformable umbrella-shaped valve portion being movable between a closed position in which the flexibly deformable umbrella-shaped valve portion contacts the partition wall and covers the communicating bore to prevent fluid communication between the first chamber and the second chamber by way of the communicating bore, and an open position in which the flexibly deformable umbrella-shaped valve portion contacts the gasket member and is spaced from the partition wall to permit fluid communication between the first chamber and the second chamber by way of the communicating bore, the contact of the flexibly deformable umbrella-shaped valve portion with the gasket member restraining a deforming amount of the umbrella shaped valve portion in the open position.

13. A valve structure according to claim 12, further comprising a supporting portion which supports a top portion of the flexibly deformable umbrella shaped valve portion to prevent the valve body from being dislocated from the partition wall.

14. A valve structure, according to claim 12, wherein the partition wall includes an assembling bore, the valve body including a base portion positioned in the assembling bore, the valve body also including a larger diameter portion having an outer diameter larger than the outer diameter of the base portion, the flexibly deformable umbrella shaped valve portion being at one end of the base portion and the larger diameter portion being at an opposite end of the base portion.

15. A valve structure, according to claim 12, wherein
the first fluid chamber includes a pump chamber defined by the cylinder and a piston in the cylinder to reciprocate within the cylinder,
the second fluid chamber is formed in the valve housing,
the second fluid chamber includes an intake chamber from which the fluid is suctioned to the pump chamber and a discharge chamber to which the fluid is discharged from the pump chamber.

16. A valve structure, according to claim 15, wherein the partition wall includes a recessed portion, and the valve body is positioned in the recessed portion.

17. A valve structure, according to claim 16, wherein a cutout portion is formed at a side wall surface portion of the recessed portion at a position corresponding to the communicating bore.

18. A valve structure according to claim 17, wherein the intake chamber is opened to an external ambient, a volume of the pump chamber is changeable to be increased and decreased, and the fluid including air is discharged from the pump chamber to the discharge chamber through the communicating bore.

19. A valve structure according to claim 17, wherein the discharge chamber is opened to an external ambient, a volume of the pump chamber is changeable to be increased and decreased, and the fluid including air is suctioned from the intake chamber to the pump chamber through the communicating bore.

20. A valve structure according to claim 12, wherein the valve body is held between the gasket member and the partition wall.

* * * * *